March 8, 1955     W. P. KISTLER     2,703,848

PIEZOELECTRIC PRESSURE INDICATOR

Filed June 9, 1954

INVENTOR:
WALTER P. KISTLER
By: Wenderoth, Lind &
Ponack
Attorneys.

United States Patent Office 2,703,848
Patented Mar. 8, 1955

2,703,848

PIEZOELECTRIC PRESSURE INDICATOR

Walter P. Kistler, Niagara Falls, N. Y., assignor to Schweizerische Lokomotiv- und Maschinenfabrik, Winterthur, Switzerland Application June 9, 1954, Serial No. 435,409

Claims priority, application Switzerland June 10, 1953

5 Claims. (Cl. 310—8.7)

This invention relates to a piezoelectric pressure indicator, particularly for measurement of the gas pressure of internal combustion engines, in which the annular space of the crystal chamber between the crystal column and its casing towards the pressure measuring room is closed by means of a membrane.

Such pressure indicators can be built as so called diaphragm or shell indicators (of e. g. "Forschung," vol. 8, 1937, p. 249 and the following pages). In both types it is necessary, in order to get high sensitivity of the indicator, to provide an extremely thin and resilient diaphragm. On the other hand the reduction of the thickness of the diaphragm is limited for reasons of strength, since the instruments must be able to withstand a certain maximum gas pressure. In pressure indicators of the older type, i. e. the membrane indicators, the conditions are even worse due to the fact that the diaphragm must not only act as a sealing member but, in addition, has to provide the axial initial tension of the crystals. In the more recent types, the shell indicators, this difficulty is overcome, since the initial tension of the crystals is produced by the shell itself.

Indicators of the latter type are known, in which the annular air gap between the crystal column i. e. the shell and the casing socket is made very small, in order to limit the free surface subjected to the gas pressure and to reduce the thickness of the diaphragm. Due to this disposition on the other hand, the radially free deflection length of the diaphragm is reduced, which for a satisfactory compensation of unequal linear extensions of crystal column and casing socket would be necessary. In said known construction, therefore stiffening effects between the two parts and errors in indication of the instrument resulting therefrom cannot be avoided.

The invention has as its object to substantially eliminate these drawbacks and provide a larger and yet thinner diaphragm, i. e. considerably more resilient and soft.

According to the invention, the diaphragm which is made so thin, that it would not withstand the nominal gas pressure ($p_n$), is supported on its inside by annularly arranged bridges, which on the one hand bear against the casing and on the other hand against the crystal support. In order that the invention may be better understood and put into practice one embodiment of the invention is hereinafter described by way of example with reference to the accompanying drawings, in which.

Figure 1:
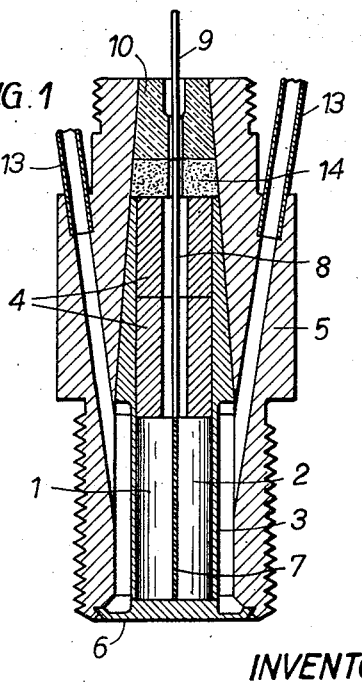
Fig. 1 is a piezoelectric pressure indicator, in longitudinal section.

The instrument shown in Fig. 1 is an indicator of the shell type. The quartz rods 1 and 2 being complementary to the shape of a cylinder, are seated in the thin-walled part of the shell 3 and are pre-tensioned by means of the steel cylinders 4 pressed into the thickwalled part.

The shell itself is fitted with its upper conical end in the correspondingly conical bore of casing 5. Its lower mushroom shaped end, which has to take up the gas pressure, is at its rim formed as a diaphragm 6 being gas-tightly rolled into the socket of the casing 5.

If stress is applied to the quartz column in longitudinal direction, a charge is produced on the surface of the quartz cylinder e. g. a positive charge, which is earthed by the shell 3. The countercharge produced in the interior of the cylinder at the dividing plane is taken up by a thin copper sheet 7 and fed over the conductor 8 to the contact 9, which is provided with an amber isolator. Through the tubes 13 cooling water can be fed to the pressure indicator, if needed. The drying agent 14 serves to absorb moisture which might possibly enter.

The pressure transmission effects not only the quartz rods 1, 2, but also the shell 3. In accordance with their modulus of elasticity the quartz rods 1, 2 will be somewhat compressed and the very thin shell 3, which is pretensioned loses its tension to the same extent and is elastically shortened. Accordingly the shell end carries out a small axial displacement with respect to the casing socket, which must be equalized by elastic deformation of the diaphragm 6. The more resilient this diaphragm is the less the sleeve will be hindered in its axial displacement and the greater will be the sensitivity of the indicator.

Figure 2:
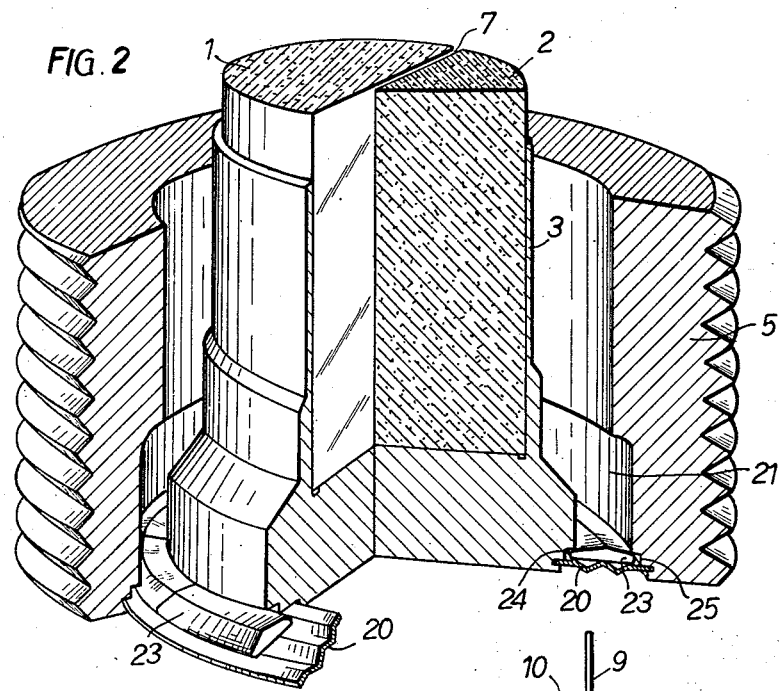
Fig. 2 is the lower part of a piezoelectric pressure indicator drawn to a larger scale.
Figure 3:
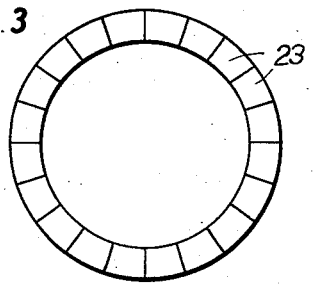
Figs. 3 and 4 are details.
Figure 4:
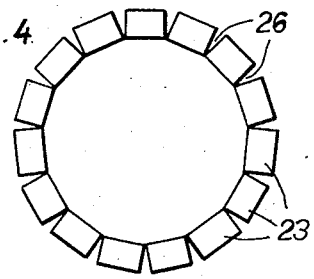

In a modification according to Fig. 2 the lower part of a pressure indicator being drawn to a larger scale, the diaphragm part is no more shaped as in Fig. 1, but is formed in accordance with the invention. The annular diaphragm 20 is rolled into the casing and into the thick end of the shell 3. The diaphragm has a corrugated profile and is very thin so that by itself it would not be able to withstand the gas pressure risen to its nominal value $p_n$. Therefore relatively rigid bridges 23 are placed over the annular gap to support the diaphragm, the inner and outer ends of the bridges loosely lying in the recesses 24 and 25. As shown in Fig. 3, the annular parts are arranged loosely adjacent to each other and form a ring of 20 elements for instance. They can be provided with parallel end faces 26, whereby according to Fig. 4 only the inner edges will contact and small free surfaces of triangular shape will be produced.

If now the instrument is subjected to the gas pressure to be measured, the diaphragm is immediately pressed against the bridges and these transmit the respective pressure force to about equal parts to the casing 5 and to the crystal column. The diaphragm itself is subjected to only insignificant loads. Due to its exceptionally small thickness and the relatively large radial extension the diaphragm forms a very resilient and soft intermediate member and does not hinder the compression of the quartz column and the corresponding shortening of the shell, necessarily taking place upon exertion of a pressure in any way. Also the bridges will not resist these small relative movements since their loosely supported ends can carry out small tilting movements. Due to the same reasons, the elongation differences between casing and shell caused by temperature and fixing will have no, or only an insignificant, influence upon the amount of initial tension or the calibration factor of the pressure indicator.

The diaphragm could also be smooth instead of corrugated whereby, however, it would lose resilience.

Further, instead of an annular diaphragm 20, a full diaphragm disc might be used, which would loosely abut against the shell end or be attached to the latter.

The invention cannot only be applied to shell indicators, but also to the membrane type of indicator mentioned in the preamble if no, or only a slight, initial tension of the crystals is required.

I claim:

1. A piezoelectric pressure indicator comprising a casing, a crystal support arranged in said casing in spaced relation with the inner wall thereof to form an annular chamber between said casing and said crystal support, a crystal provided in said crystal support, a thin annular diaphragm closing one end of the said annular chamber and connecting said casing with said crystal support, and annularly arranged bridge-members supporting said diaphragm on the inside thereof and being in engagement with said casing and said crystal support.

2. A piezoelectric pressure indicator comprising a casing, a crystal support arranged in said casing in spaced relation with the inner wall thereof, to form an annular chamber between said casing and said crystal support a crystal provided in said crystal support, a thin annular diaphragm closing one end of said annular chamber and connecting said casing with said crystal support, said annular diaphragm being formed with annular corrugations and annularly arranged bridge-members supporting said diaphragm on the inside thereof and being in engagement with said casing and said crystal support.

3. A piezoelectric pressure indicator comprising a casing, a crystal support arranged in said casing in spaced relation with the inner wall thereof to form an annular chamber between said casing and said crystal support, a crystal provided in said crystal support, a thin annular diaphragm closing one end of said annular chamber and connecting said casing with said crystal support, said annular diaphragm being formed with annular corrugations, and annularly arranged bridge-members supporting said diaphragm on the inside thereof, and being in engagement with said crystal support and said casing, said bridge-members being formed by a plurality of annular segments loosely arranged in end to end abutting relation.

4. A piezoelectric pressure indicator, according to claim 3, wherein the bridge-members have end faces arranged parallel to each other and contacting each other only by their inner edges, so that free intermediate spaces of triangular shape are provided between the bridges.

5. A piezoelectric pressure indicator according to claim 3, wherein the bridge-members are loosely supported with their inner and outer ends in annular grooves of the crystal support and of the casing, respectively.

References Cited in the file of this patent

UNITED STATES PATENTS

| | | |
|---|---|---|
| 2,248,574 | Knight | July 8, 1941 |
| 2,454,264 | Stigter | Nov. 16, 1948 |
| 2,507,636 | Kistler | May 16, 1950 |